United States Patent [19]

Grimes

[11] Patent Number: 4,637,968
[45] Date of Patent: Jan. 20, 1987

[54] SOLID BROMINE COMPLEXERS

[75] Inventor: Patrick G. Grimes, Westfield, N.J.

[73] Assignee: Exxon Research and Engineering Company, Florham Park, N.J.

[21] Appl. No.: 837,273

[22] Filed: Mar. 7, 1986

[51] Int. Cl.[4] ............................................. H01M 10/36
[52] U.S. Cl. ....................................... 429/105; 429/15; 429/101; 429/199
[58] Field of Search ........................ 429/15, 17, 19, 51, 429/70, 72, 101, 105, 199

[56] References Cited

U.S. PATENT DOCUMENTS

| | | | |
|---|---|---|---|
| 2,566,114 | 8/1951 | Bloch | 429/199 |
| 3,738,870 | 6/1973 | De Rossi | 429/198 |
| 3,809,578 | 5/1974 | Symons | 429/51 |
| 3,811,945 | 5/1974 | De Rossi | 429/105 |
| 3,816,177 | 6/1974 | Walsh | 429/194 |
| 4,065,601 | 12/1977 | Ajami et al. | 429/105 X |
| 4,105,829 | 8/1978 | Vernero | 429/15 |
| 4,124,747 | 11/1978 | Murer et al. | 429/210 |
| 4,162,351 | 7/1979 | Putt et al. | 429/101 X |
| 4,550,065 | 10/1985 | Fujii et al. | 429/105 |

Primary Examiner—Anthony Skapars
Attorney, Agent, or Firm—Joseph J. Dvorak

[57] ABSTRACT

The cell of the invention comprises a housing, a zinc or cadmium anode, a chemically non-reactive counterelectrode and cathodic halogen. The cathodic halogen is selected from chlorine and bromine, and preferably is bromine. The cell also is provided with an aqueous metal halide containing electrolyte in which the metal ions are of the same metal as the metal of the anode and halide anions are of the same halogen as the cathodic halogen material. Importantly, in the present invention, anion exchange resins provide a convenient means for storing the halogen generated during charging of the cell and providing a source of halogen to be used in the discharge of the cell.

9 Claims, 3 Drawing Figures

SOLID BROMINE COMPLEXERS

The Government of the United States of America has rights in the invention pursuant to Contract Agreement No. 26-6578 entered into with Sandia National Laboratories on behalf of the United States Department of Energy.

FIELD OF THE INVENTION

This invention relates to zinc halogen cells having an aqueous solution of a metal halide as the electrolyte. More particularly, the present invention relates to secondary cells and techniques wherein the cathodic halogen is reversibly complexed in the battery system.

THE PRIOR ART

Electrochemical cells have been proposed which have an electrode with a high positive oxidizing potential and another electrode with a strong negative or reducing potential. Typical of such cells is the metal halogen cell in which the anode material most commonly employed is zinc and the most commonly employed cathodic halogen is bromine. Among the advantages of such cells is their extremely high theoretical energy density. For example, a zinc bromine cell has a theoretical energy density of 200 wh/lb, i.e., watt hours per pound, and an electrode potential of about 1.85 volts per cell.

Electrochemical cells of the foregoing type are known to suffer from a number of disadvantages. Most of these disadvantages are associated with side reactions which may occur in such cells. For example, during the charging process, free bromine is produced in the cell. This free bromine is available for electrochemical reaction with the metal anode thereby resulting in auto discharge of the cell. Additionally, there is a tendency for hydrogen gas to be generated when consiiderable amounts of free bromine are present in the aqueous phase.

The art is replete with efforts on the part of many investigators to overcome the above-mentioned disadvantages. In U.S. Pat. No. 2,566,114, for example, the use of tetraethyl and tetramethyl ammonium bromide for combining with bromine generated during charging of the cell is disclosed. The tetramethyl ammonium salt is added to the powdered carbon surrounding the cathode.

In U.S. Pat. No. 3,738,870, the use of a solid mixture of alkyl ammonium perchlorate and conductive materials such as graphite to form solid addition products with halogen released during charging of such cells is disclosed.

In U.S. Pat. No. 3,811,945, the use of certain alkyl ammonium perchlorates, diamine bromides and diamine perchlorates which are capable of forming solid addition products with cathodic bromine and which are substantially insoluble in water is disclosed.

In contrast to those references which suggest forming solid addition products with bromine, U.S. Pat. No. 3,816,177 discloses the use of a quaternary ammonium halide and an aprotic solvent in the electrolyte. The function of the quaternary ammonium halide is to complex halogen. The function of the aprotic solvent apparently is to form water immiscible complex with the complex of halogen and quaternary ammonium salt.

In U.S. Pat. No. 4,105,829, a metal halogen cell, such as a zinc-bromine cell, is disclosed which employs a circulating electrolyte system that contains a complexing agent to effectively remove cathodic halogen from the electrolyte during charging of the cell. The complexing agent is one which in the presence of halogen forms of water immiscible halogen complex which can be separated and stored external the cell during charging of the cell and returned to the cell during cell discharge.

In U.S. Pat. No. 3,809,578, there is disclosed a zinc-chlorine cell in which chlorine is stored external the cell in the form of a chlorine hydrate.

As will be readily appreciated, even with the use of the aforementioned complexing techniques, self-discharge of metal halogen cells will not be totally eliminated since some of the cathodic halogen will remain in the aqueous phase notwithstanding the use of these complexing agents. Indeed, the presence of some halogen is desirable, particularly when current is being withdrawn from the cell.

Thus, while many references cited above show a continuing effort on the part of numerous investigators to overcome the disadvantages associated with metal halogen cells of the type referred to herein, the methods proposed have not adequately overcome the problems encountered in such systems. Consequently, there remains a need for more effective methods for preventing loss of cell capacity in aqueous metal halogen cells.

SUMMARY OF THE INVENTION

Accordingly, in one aspect of the present invention, an improved metal halogen cell is provided. Broadly stated, the cell of the invention comprises a housing, a zinc or cadmium anode, a chemically non-reactive counterelectrode and cathodic halogen. The cathodic halogen is selected from chlorine and bromine, and preferably is bromine. The cell also is provided with an aqueous metal halide containing electrolyte in which the metal ions are of the same metal as the metal of the anode and halide anions are of the same halogen as the cathodic halogen material. Importantly, in the present invention, anion exchange resins provide a convenient means for storing the halogen generated during charging of the cell and providing a source of halogen to be used in the discharge of the cell.

These and other features of the present invention will be better understood in view of the following detailed description and accompanying drawings which form a part of the specification therein.

DETAILED DESCRIPTION OF THE INVENTION

For convenience, in the detailed description which follows, the metal of the metal halogen couple will be referred to as the anode and the halogen as the cathode. It will be appreciated, however, that the metal halogen cell is a secondary cell and consequently the halogen acts as a cathode on discharge and as an anode on charging. Similarly, the metal of the couple acts as an anode on discharging and as a cathode on charging. Also, for convenience, specific reference will be made to an aqueous zinc bromine cell having a zinc bromide containing electrolyte. However, it should be appreciated that the present invention also contemplates cells having a cadmium anode, in which event the metal bromide of the electrolyte will be a cadmium bromide. Similarly, the cathode of the cells of the present invention may alternatively be chlorine, in which event the electrolyte will contain zinc or cadmium chloride, as the case may be.

It should be noted that while the cathode in the practice of the present invention is a halogen, such as bromine, it is, of course, generated or consumed at an electrode structure which is made of conventional electrically conductive materials. Preferably the electron is constructed of electrically conductive carbon plastics, such as that disclosed in U.S. Pat. No. 4,124,747. Similarly, while the anode-active material is a metal, such as zinc, it is, of course, deposited on an electrode structure which can be formed from the metal itself or other electrically conductive materials, such as the carbon plastic referred to in connection with the electrode for generation of cathodic halogen.

Additionally, in the description which follows, reference will be made to polybromide ions; however, it should be readily appreciated that a wide combination of halogens may be substituted for the bromine in the polybromine ions. Indeed, in some instances, it may be advantageous to use two or more different halogens in varying concentrations in the electrolyte of the present invention which will generate polyhalide ions during cell charging such as $Br_2Cl^-$, $Br_3$, and $Cl_2Br^-$.

Figure 1:
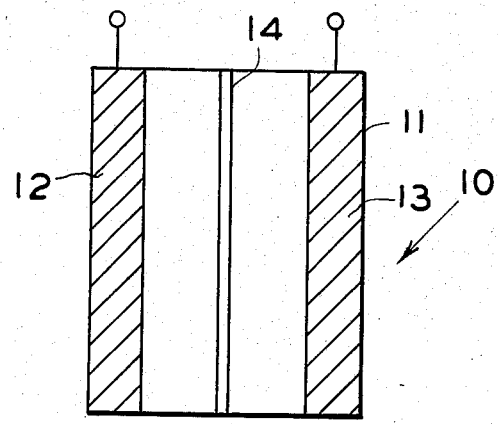
FIG. 1 is a cross-sectional view of a metal halogen cell according to the present invention.

Turning now to FIG. 1, there is shown one embodiment of an electrochemical cell of the present invention. As can be seen, cell 10 consists of a housing 11 and anode electrode 12 and a counterelectrode 13. The anode 12 and counterelectrode 13 are separated by porous separator 14. The separator can be any porous material typically used to prevent physical contact of the two electrodes, such as fiberglass mats, fiberglas felt and microporous polymeric materials, such as porous polyethylene and the like. Electrode 12 acts as the structure on which zinc is deposited during cell charging while counterelectrode 13 acts as the structure at which bromine is generated. The space between the electrodes not occupied by the separator is filled with aqueous electrolytes such as an aqueous 3M zinc bromide solution. Importantly, incorporated in the electrode structure 13 is anion exchange resins for complexing cathodic halogen. These resins will be described in greater detail hereinafter.

Figure 2:
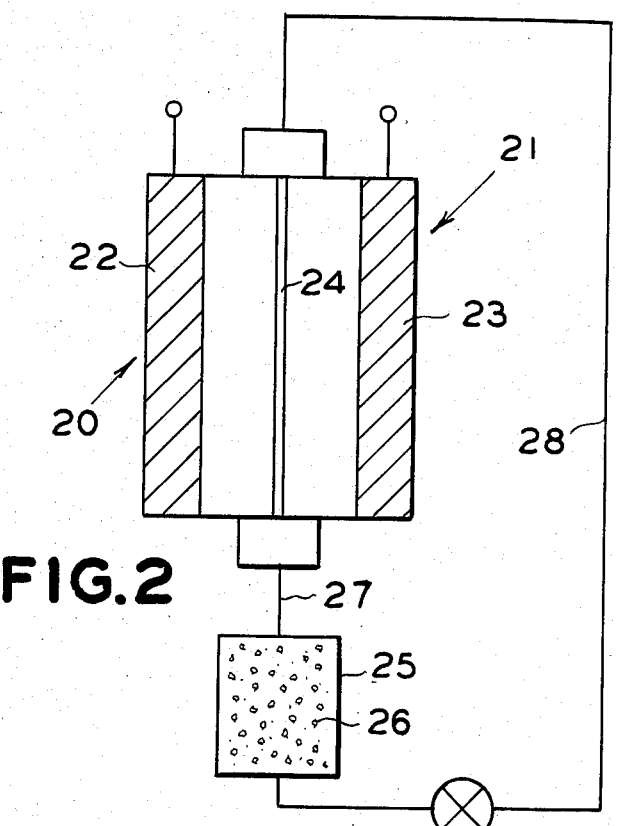
FIG. 2 is a schematic diagram of a metal halogen cell in accordance with the present invention illustrating external storage of halogen and circulating electrolyte in accordance with the present invention.

Referring now to FIG. 2, there is shown an electrochemical cell 20 which has an anode electrode 22 disposed in housing 21. Spaced apart from anode 22 is a chemically non-reactive or inert counterelectrode 23. Inert electrode 23 is disposed within housing 21 so as to define with the enclosing walls of the housing 21 and anode 22 an electrolyte chamber. Optionally, the cell is provided with a porous separator 24 much the same as separator 14 of the cell of FIG. 1. The separator 24 merely prevents physical contact of the two electrodes but does not restrict movement of ionic materials in the electrode.

As can be seen in FIG. 2, communicating with the electrolyte chamber of the cell is a separation zone 25. This separation zone 25 consists of a container charged with solid anion exchange resin material 26 in accordance with the practice of the present invention. The separation zone communicates with the electrolyte compartment of cell 20 via lines 27 and 28. Lines 27 and 28 are divided so as to assure good flow of electrolyte through the electrolyte chamber passed electrodes 22 and 23.

Figure 3:
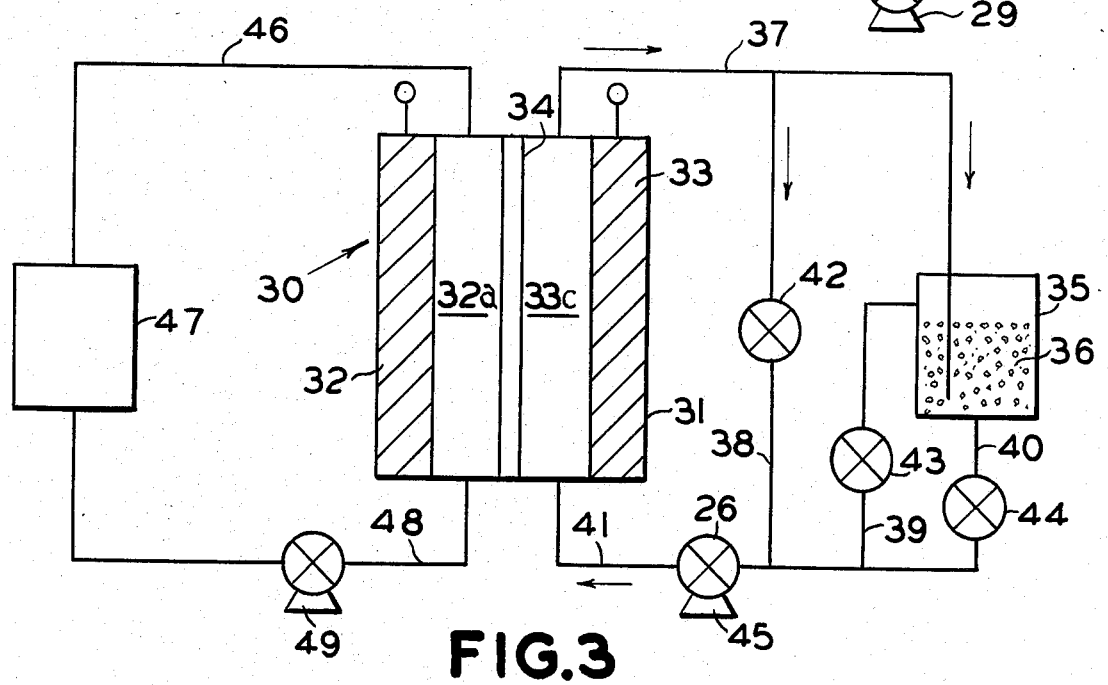
FIG. 3 is a schematic diagram of a metal halogen cell including anolyte and catholyte loops for circulating electrolyte and external storage means for halogen.

A particularly preferred embodiment of the present invention is shown in FIG. 3. Here electrochemical cell 30 has an anode 32 disposed in housing 31. Spaced apart from anode 32 is the chemically non-reactive counterelectrode 33. The cell 30 also is provided with a porous separator 34 similar to separator 14 of FIG. 1 which with electrodes 32 and 33 define anolyte and catholyte chambers 32a and 33c, respectively.

Communicating with the catholyte chamber 33c via conduit 37 is separation zone 35. As with the embodiment shown in FIG. 2, separation zone 35 is charged with solid anion exchange resin material 36 in accordance with the practice of the present invention. The separation zone 35 also communicates with the catholyte chamber 33c via conduits 40 and 41 and 39 and 41. As can be seen, conduits 38, 79 and 40 are each provided with valves 42, 43 and 44, respectively, the function of which will be described in connection with the operation of the cell. The catholyte loop described above also includes pump means 45 for circulating catholyte during operation of the cell.

As can be seen in FIG. 3, the anolyte chamber 32a communicates with an anolyte storage zone 47 via conduits 46 and 48. Pump means 49 also is provided for circulating anolyte during operation of the cell.

The electrolyte of the cell of the present invention employs an aqueous solution of a metal halide as the electrolyte. As indicated hereinabove, it is particularly preferred in the practice of the present invention that the cell have a zinc anode and a bromine cathode. Consequently, in that instant, the electrolyte will include zinc bromide in aqueous solution. In general, the concentration of the metal halide employed will be in the range of about 0.5 moles per liter to about 6.0 moles per liter, and preferably will be between about 2.5 moles per liter to about 3.5 moles per liter prior to charging of the cell. Additional materials can be added to the electrolyte to improve conductivity. Thus, for example, potassium chloride, ammonium chloride and the like may be added to the aqueous electrolyte solution.

The anion exchange resins employed in the practice of the present invention consists of resins having moieties capable of forming polyhalide complexes with halogen. Indeed, it is particularly preferred in the practice of the present invention that the anionic exchange resins have, as the complexing moiety, tertiary amines or quaternary ammonium groups. These anion exchange resins are commercially available materials. Among those suitable in the practice of the present invention are those anion exchange resins sold under the tradename Amberlight ion exchange resins by Rohm & Haas Company, Philadelphia, Pa., such as Amberlight IRA-402 and Amberlight IRA-938.

As indicated in connection with FIG. 1, the anion exchange resin can be incorporated in electrode 13; however, it is particularly preferred in the practice of the present invention that the anion exchange resin be used in the manner described in connection with FIGS. 2 and 3.

Additionally, small amounts of water soluble halogen complexing agents may be included in the electrolyte to enhance the rate at which the halogen is complexed with the anion exchange resins. Examples of such water soluble complexing agents include quaternary ammonium compounds, especially those quaternary compounds having the following structural formulas:

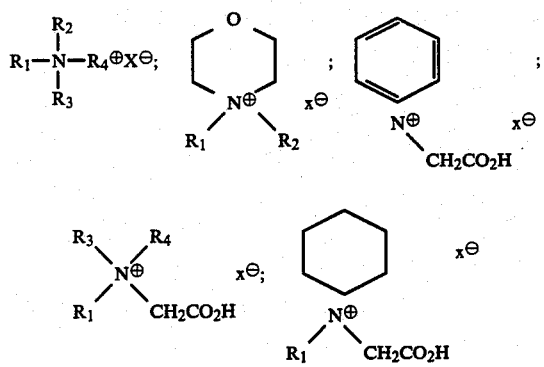

wherein R1, R2, R3 and R3 are different alkyl groups or haloalkyl groups of from about 1 to 8 carbon atoms and x is selected from chlorine, bromine and iodine.

Operation of the cell of the present invention will now be described using the zinc bromine couple for the purposes of illustration and referring specifically to FIG. 3 of the drawings. In this embodiment, the anolyte and catholyte each will have the same initial composition as the electrolyte composition described above; however, after the catholyte contacts the resin 36 negatively charged zinc halide complexes in the catholyte, e.g., $ZnX_4^=$ and $ZnX_3^-$ where X is $Cl^-$, $Br^-$, $Br_3^-$, $Br_2Cl^-$, etc., will associate with the resin so that in the discharged state the aqueous phase has a lower zinc content. In any event, although operation of the cell of the present invention will be described in connection with the FIG. 3 embodiment, the underlying principle of operation are the same for all embodiments.

Turning now to the operation of the cell, first the anolyte and catholyte are circulated through the cell 30 by pumps 49 and 45, respectively, via lines 46 and 48 for the anolyte and lines 37, 39 and 41 for the catholyte. Thus, in the catholyte loop valves 42 and 44 are closed. While the electrolyte is being circulated through the cell, an electric current is impressed between the electrodes 32 and 33. This electromotive force operates to deposit metallic zinc on the electrode 22 while generating molecular bromine at chemically inert electrode 23. The bromine produced will associate with bromide ions in the catholyte to form polybromide ions such as $Br_3^-$, and $Br_5^{31}$. This bromine laden catholyte circulates through storage zone 35. As it circulates through zone 35, the polybromide ions are exchanged with the ion exchange resin also displacing negatively charged zinc species thereby supplying the electrolyte with zinc bromide. Consequently, the bromine generated during charging of the cell is not circulated back through the cell, at least in any substantial amount during the continuing charging of the cell. During discharge of the cell, valve 43 is closed and valve 44 is opened while the electrolyte is circulated. During discharge, the polybromide ions in the circulating electrolyte are consumed at the cathode producing bromide ions and zinc halide complexes. These products displace more polybromide ions from the resin while the electrolyte is circulated through the bed of resin. The stored bromine in the resin is thus transferred to the bromine electrode. During discharge of the cell, optionally valve 42 is partially opened thereby providing a metering of the bromine laden electrolyte flowing through the cell.

While operation of the cell has been described in connection with a preferred embodiment, it should be readily appreciated other means may be employed in liberating the bromine from the ion exchange resin such as, for example, using another species, like $CO_2$, to displace the bromine from the resin.

The following example further illustrates the invention.

EXAMPLE

An 8-cell (600 cm$^2$) bipolar, zinc/bromine battery was charged with an aqueous electrolyte containing 3M zinc bromide and 0.1M N-methyl-N-ethyl morpholinium bromide solution. The total electrolyte volume was 4 liters. The battery was equipped with two circulating electrolyte loops, an anolyte loop and a catholyte loop. Separators within the cells between the cell electrodes kept the electrolytes in two loops from mixing. The electrolyte in the anolyte loop was pumped from an anolyte reservoir past zinc deposition electrode surfaces of the cell stack and returned to the anolyte reservoir. The electrolyte in the catholyte loop was pumped from the catholyte reservoir past the bromine production and consumption electrode surfaces of the stack and then returned to the catholyte reservoir. The catholyte reservoir contained 200 grams of anion exchange resin beads (IRA 900 series from Rohm and Haas Co.). The electrolyte stream returning from the cell was directed into the catholyte reservoir in a manner to fluidize the resin beads thereby promoting good contact between the electrolyte and the beads. The electrolyte, after contacting the beads, passed into the pump and returned to the cell stack.

The battery was charged to an input loading of 60 mAh/cm$^2$. Zinc metal deposited on the zinc electrodes and bromine was produced on the bromine electrode. The bromine in the catholyte was carried to the reservoir, where it was taken up by the beads. The reservoir had glass walls and the action could be observed. Initially, the beads were yellow in color; but, as the battery became more charged, the beads became orange in color, and then more reddish. This indicated a loading of bromine into the beads.

During the discharge of the battery, the process reversed. Bromine in the circulating catholyte was consumed at the bromine electrodes, and zinc was oxidized at the zinc electrodes. The catholyte with reduced bromine concentration was passed into the catholyte reservoir, where bromine was transferred from the beads back into the aqueous catholyte electrolyte. The bromine-enriched electrolyte was then pumped in the cell stack. The color of the beads changed back from the red to orange to yellow during the discharge.

What is claimed is:
1. A metal halogen electrochemical cell comprising:
   an aqueous electrolyte containing a metal halide, the metal thereof being selected from zinc and cadmium;
   an electrode at which to deposit said metal of said metal halide during charging of said cell;
   a counterelectrode at which to generate the halogen of said metal halide during charging of said cell; and anion exchange resin for storing the halogen generated during charging of the cell and providing a source of halogen during discharging of said cell.

2. The cell of claim 1 wherein said resin is located external said cell and including means for circulating said electrolyte through said resin whereby halogen is stored in said resin during charging of said cell and is supplied to said electrolyte during discharging of said cell.

3. The cell of claim 2 including a membrane separator between said electrode and said counterelectrode thereby defining an anolyte and catholyte compartment; means for separately circulating said electrolyte through said anolyte and said catholyte compartment; and wherein only said catholyte is circulated through said resin.

4. The cell of claim 3 wherein said halide is bromide.

5. The cell of claim 4 wherein said metal is zinc.

6. In a secondary metal halogen electrochemical cell having a negative electrode and a positive halogen electrode, an electrolyte containing halogen therein, the improvement comprising anion exchange resin for storage of halogen during charging of said cell.

7. The improvement of claim 5 wherein said anion exchange resin is located within said cell.

8. The improvement of claim 6 wherein said anion exchange resin is located external said cell and means are provided for circulating said electrolyte through said cell and said resin.

9. A zinc bromine battery system comprising:
at least one zinc bromine electrochemical cell, said cell including an electrode on which to deposit zinc and a counterelectrode at which to generate bromine, said cell having an aqueous zinc bromide containing anolyte and catholyte, and a microporous separator between said electrode and counterelectrode thereby defining anolyte and catholyte compartments;
anolyte and catholyte storage means external said cell, said catholyte storage means including an anion exchange resin; and
means for separately circulating said anolyte and catholyte through the anolyte and catholyte compartments and back to said anolyte and catholyte storage means.

* * * * *